UNITED STATES PATENT OFFICE.

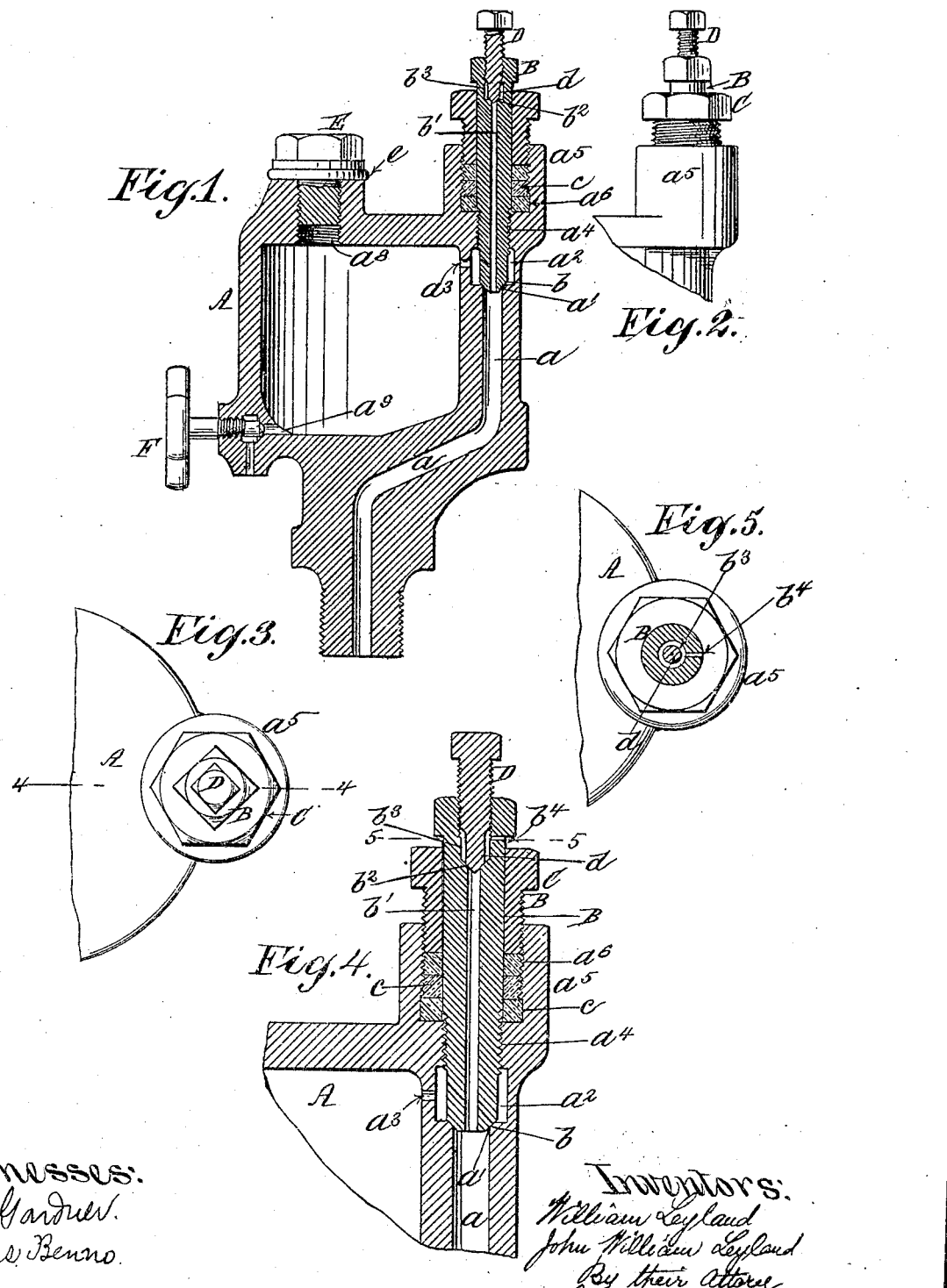

WILLIAM LEYLAND AND JOHN WILLIAM LEYLAND, OF NEW YORK, N. Y.

LUBRICATOR.

No. 851,359.  Specification of Letters Patent.  Patented April 23, 1907.

Application filed March 10, 1906. Serial No. 305,204.

*To all whom it may concern:*

Be it known that we, WILLIAM LEYLAND, formerly a subject of Great Britain, having declared his intention of becoming a citizen of the United States, and JOHN WILLIAM LEYLAND, a citizen of the United States, both residing in the borough of Bronx, city, county, and State of New York, have invented certain new and useful Improvements in Lubricators, of which the following is a specification.

The invention relates to the class of oil cups or receptacles in which the lubricant is displaced by steam or other fluid admitted to the oil receptacle through a channel or conduit which also conducts the displaced oil to the part to be lubricated. While the invention is adapted to this class of lubricators generally, it is especially adapted to lubricators designed for use in connection with rock drills, hoisting engines, and the like, where the parts are subjected to rough usage.

The invention consists in the special arrangement of parts hereinafter described and claimed specifically.

In the accompanying drawings, Figure 1, is a central vertical sectional elevation of the lubricator upon a reduced scale; Fig. 2, is an elevation of the packing box and adjacent parts; Fig. 3, is a plan upon a larger scale of a portion of the lubricator; Fig. 4, is a vertical section upon plane of line 4—4—Fig. 3; Fig. 5, is a section upon plane of line 5—5— Fig. 4.

The body of the oil receptacle or reservoir A, is preferably made in one piece,—the top, bottom, sides, and external protrusions for connections being cast integral, as will be understood by reference to Fig. 1, of the drawings, by which it will be seen that the passage or conduit $a$, is formed directly within the base and side wall of said reservoir,—said conduit $a$, constituting and affording a passage for the inlet of the steam or other fluid, and the outlet, simultaneously, of the oil to the parts to be lubricated as in other lubricators of this class. The conduit $a$, extends to near the top of the reservoir A, where it emerges through a valve seat $a'$, into a valve chamber $a^2$, having a lateral port $a^3$, communicating with the interior of the reservoir.

B is a valve stem, the lower end of which constitutes the valve $b$, which is formed for engagement with the seat $a'$, interposed between the passage $a$, and the valve chamber $a^2$. A portion of the valve stem B, is threaded peripherally for engagement with a female screw thread $a^4$, tapped in the top of the receptacle A, above said valve chamber $a^2$,—this part of the top of the receptacle being formed with the cylindrical extension $a^5$, which constitutes the stuffing box $a^6$, containing the packing $c$, which is compressed by the screw follower C, to prevent the escape of steam or oil around the valve stem B, externally.

It is to be understood that the upper or outer end of the valve stem B, is square in cross section or otherwise formed for engagement with an implement or tool by means of which the valve stem may be turned axially in either direction to adjust the valve $b$, with relation to its seat $a'$. In this connection it must be understood that the packing of the valve stem B externally is an essential feature, as will hereinafter be seen, since the internal pressure under ordinary conditions in the use of a lubricator of this character is sufficient to force the lubricant between the opposed surfaces of the male and female screw threads by which the valve stem is held in position.

The valve stem B, is formed with an axial passage or conduit $b'$, opening into the conduit $a$, at its lower end, and terminating in a valve seat $b^2$, at its upper extremity. This passage $b'$, is closed normally by a valve $d$, formed upon or constituting the lower end of the valve stem D, said valve stem D being threaded peripherally for engagement with a female screw thread formed for its reception in the upper extremity of the valve stem B. The valve stem D is also provided with a rectangular head or otherwise formed for engagement with a tool or implement by which the valve stem D, may be turned axially to adjust the valve $d$, with relation to its seat $b^2$.

Above the valve seat $b^2$, the valve stem B is preferably formed with an annular space or valve chamber $b^3$, provided with a lateral opening $b^4$, into the atmosphere, although this latter construction is not essential nor indispensable, since we have found by actual experience that in the absence of this lateral discharge port $b^4$, when both valves $b$ and $d$, are open, the internal pressure is sufficient to force the lubricant, if any be present, through the screw thread by which the stem D, and the stem B are coupled together, thereby indicating the presence of oil within the receptacle A. While this is not a preferred method of testing for the presence of oil, still it is a practical one, and for this reason we do not deem it expedient to limit ourselves to the use of the lateral port $b^4$, which is shown in Fig. 4 and which is omitted in Fig. 1.

It will be seen that in either case, that is to say, whether the laterar port $b^4$ be provided or omitted, the valve $d$, and its stem D, constitute a simple, practical and effective means of testing for the presence of the lubricant within the receptacle,—provided of course that the valve B, is opened so as to admit of the pressure of steam or other fluid for the displacement of the lubricant, as is the case when the lubricator is in actual use.

E, is a screw plug for closing the opening $a^8$, through which oil is supplied to the reservoir A,—$e$, being the washer interposed between the head of said screw plug and the top of the receptacle; and $a^9$ is a drain passage closed by a screw plug or valve F.

In practice, the valve $b$, being raised from its seat the steam rising through the conduit $a$, passes between the valve seat $a'$, and said valve $b$, and enters the reservoir A, through the lateral port $a^3$. The condensation of steam within the chamber A, causes the water of condensation to sink to the bottom thereof, thereby displacing a corresponding amount of oil which flows through the port $a^3$, into the chamber $a^2$, spreading itself around the latter and over the seat $a'$, and flowing down through the sides of the passage $a$, in an annular or tubular stream through which the steam ascends centrally. Under these conditions if the valve $d$, is raised from its seat oil appears through the lateral port $b^4$, or in the absence of the latter, between the screw threads by which the valve stems B and D are connected, as hereinbefore set forth.

It will be seen that by this construction and arrangement of parts we practically obviate the need of, or rather dispense with the use of, a separate and independent device for testing for the presence of oil, since it is obvious that the two valve stems B and D constitute essentially one device in so far as external appearance or conditions are concerned, the single protuberance or stuffing box on the top of the lubricator answering for both valves and stems.

We thus attain the main object of our invention which is that of dispensing entirely with the ordinary glass tube gauge, which is not adapted to the requirements of lubricators for rock drills, hoisting engines and the like, where the parts are subjected to rough usage.

What we claim as our invention and desire to secure by Letters Patent is,

1. In a lubricator of the character designated, a reservoir formed with a vertical conduit for the inlet of steam and the gravitating outlet of oil there being a port between the lubricant chamber and said conduit, and a valve seat interposed between said conduit and said port, a valve adjustably supported with relation to said seat the stem of which valve is formed with a longitudinal passage opening through the valve into said conduit in alignment with the inlet of the steam, and a valve by which the other extremity of said longitudinal passage may be closed or opened for the purpose described.

2. In a lubricator of the character designated, a reservoir formed with a vertical conduit for the inlet of steam and the gravitating outlet of oil, there being a port between the lubricant chamber and said conduit, and a valve seat interposed between said conduit and said port, a valve adjustably supported with relation to said seat the stem of which valve is formed with a longitudinal passage opening through the valve into said conduit in alignment with the inlet of the steam, and a screw valve by which the other extremity of said longitudinal passage may be closed or opened, for the purpose described.

3. In a lubricator of the character designated, a reservoir formed with a vertical conduit for the inlet of steam and the gravitating outlet of oil, there being a port between the lubricant chamber and said conduit, and a valve seat interposed between said conduit and said port, a valve adjustably supported with relation to said seat the stem of which valve is formed with an axial passage opening through the said valve into the said conduit in alignment with the inlet of the steam, and a screw valve on the outer extremity of the said valve stem, arranged to close or open the outer extremity of said axial passage in the valve stem for the purpose described.

4. In a lubricator of the character designated, a reservoir formed with a vertical conduit for the inlet of steam and gravitating outlet of oil, there being a port between the lubricant chamber and said conduit, and a valve seat interposed between said conduit and said port, a valve adjustably supported with relation to said seat the stem of which is formed with an axial passage opening at one extremity through the said valve into said conduit in alignment with the inlet of the steam and at the other extremity opening into a valve chamber formed with an opening communicating with the atmosphere, and a screw valve on the outer extremity of said valve stem and screw threaded thereinto and adjustable longitudinally therein, arranged to close or open the outer end of said axial passage, for the purpose described.

5. In a lubricator of the character designated, a reservoir formed with a vertical conduit for the inlet of steam and gravitating outlet of oil, there being a port between the lubricant chamber and said conduit, and a valve seat interposed between said conduit and said port, a valve adjustably supported with relation to said seat the stem of which is formed with an axial passage opening at one extremity through the said valve into said conduit in alignment with the inlet of the steam and terminating at the other extremity in a valve seat, said valve stem being also formed above said last named valve seat with a lateral passage communicating with the atmosphere and a screw valve adjustable longitudinally within the outer extremity of said valve stem, arranged to close or open the outer extremity of said axial passage in the valve stem, for the purpose described.

6. In a lubricator of the class described, a reservoir formed with a vertical conduit outside the same, and having a laterally inclined portion communicating with the central steam inlet, said conduit having at its upper end an enlargement forming a valve chamber and valve seat with a lateral port above said valve seat communicating with the reservoir near the upper end of the latter, said conduit serving for the simultaneous downflow of the oil and the upward passage of steam through said oil, a tubular valve fitted to said seat and having an axial passage opening into said conduit, and an annular enlargement near its upper end and a valve fitted into the upper end of the tubular valve and fitted to a seat in the enlargement of the latter.

WILLIAM LEYLAND.
   JOHN WILLIAM LEYLAND.

Witnesses:
 D. W. GARDNER,
 GEO. WM. MIATT.